(12) United States Patent
Krishnan et al.

(10) Patent No.: US 10,394,538 B2
(45) Date of Patent: Aug. 27, 2019

(54) OPTIMIZING SERVICE DEPLOYMENT IN A DISTRIBUTED COMPUTING ENVIRONMENT

(71) Applicant: INTERNATIONAL BUSINESS MACHINES CORPORATION, Armonk, NY (US)

(72) Inventors: Subramanian Krishnan, Mysore (IN); Nagarjuna Surabathina, Andhra Pradesh (IN); Bharathi Venkatasubramanian, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 15/428,444

(22) Filed: Feb. 9, 2017

(65) Prior Publication Data
US 2018/0225103 A1    Aug. 9, 2018

(51) Int. Cl.
| G06F 9/445 | (2018.01) |
| G06F 8/60 | (2018.01) |
| H04L 29/08 | (2006.01) |
| G06F 21/53 | (2013.01) |
| G06F 21/62 | (2013.01) |
| H04L 12/24 | (2006.01) |

(52) U.S. Cl.
CPC ................ *G06F 8/60* (2013.01); *G06F 21/53* (2013.01); *G06F 21/629* (2013.01); *H04L 41/5041* (2013.01); *H04L 67/34* (2013.01); *H04L 69/329* (2013.01)

(58) Field of Classification Search
CPC .......... G06F 8/60–8/65; H04L 41/0806; H04L 67/10; H04L 67/34

USPC .................................................. 717/168–178
See application file for complete search history.

(56) References Cited

U.S. PATENT DOCUMENTS

| 6,633,978 B1 | 10/2003 | Angelo et al. |
| 7,171,661 B1 * | 1/2007 | Pinera ...................... G06F 8/65 709/202 |

(Continued)

FOREIGN PATENT DOCUMENTS

WO    2014190806    12/2014

OTHER PUBLICATIONS

Mell et al., "The NIST Definition of Cloud Computing", NIST, Special Publication 800-145, Sep. 2011, 7 pages.

(Continued)

*Primary Examiner* — Jue Louie
(74) *Attorney, Agent, or Firm* — Nicholas Bowman; Andrew D. Wright; Roberts Mlotkowski Safran Cole & Calderon, P.C.

(57) ABSTRACT

A computer-implemented method includes: receiving, by a computing device, a trigger indication to deploy a new artifact into an application cluster; obtaining, by the computing device, deployment data for the new artifact from one or more service entities via external application programming interface (API) calls; storing, by the computing device, the deployment data as a deployment data object; and providing, by the computing device, the deployment data object to a plurality of instances of the application cluster via internal API calls without the need for the plurality of instances to conduct external API calls to the one or more service entities.

15 Claims, 9 Drawing Sheets

(56) References Cited

U.S. PATENT DOCUMENTS

| | | | |
|---|---|---|---|
| 7,519,964 B1* | 4/2009 | Islam | G06F 8/44 |
| | | | 717/177 |
| 8,984,101 B1* | 3/2015 | Viswanath | H04L 67/2842 |
| | | | 709/220 |
| 9,210,178 B1 | 12/2015 | Roth et al. | |
| 9,483,367 B1* | 11/2016 | Patil | G06F 11/1402 |
| 9,547,564 B1* | 1/2017 | Troutman | G06F 8/61 |
| 2005/0091346 A1* | 4/2005 | Krishnaswami | G06F 9/44505 |
| | | | 709/220 |
| 2005/0289536 A1* | 12/2005 | Nayak | G06F 8/61 |
| | | | 717/174 |
| 2010/0319006 A1 | 12/2010 | Allen et al. | |
| 2013/0031542 A1* | 1/2013 | Arcilla | G06F 8/60 |
| | | | 717/177 |
| 2013/0212574 A1* | 8/2013 | Hutchinson | H04L 41/082 |
| | | | 717/172 |
| 2014/0373011 A1* | 12/2014 | Anderson | G06F 9/45533 |
| | | | 718/1 |
| 2015/0007169 A1* | 1/2015 | Li | H04L 67/10 |
| | | | 717/177 |
| 2015/0373117 A1 | 12/2015 | Gleyzer et al. | |
| 2016/0080519 A1* | 3/2016 | Hansen | H04L 67/2852 |
| | | | 709/219 |
| 2016/0085462 A1* | 3/2016 | Buzzard | G06F 3/067 |
| | | | 711/162 |
| 2016/0139902 A1* | 5/2016 | Dimitrakos | G06F 11/30 |
| | | | 717/120 |
| 2016/0241438 A1* | 8/2016 | Sundaram | H04L 41/0806 |
| 2017/0187785 A1* | 6/2017 | Johnson | H04L 67/10 |

OTHER PUBLICATIONS

VARIA, "Architecting for the Cloud: Best Practices", https://jineshvaria.s3.amazonaws.com/public/cloudbestpractices-varia.pdf, Amazon Web Services, Jan. 2010, 21 pages.

Canonicalization, https://en.wikipedia.org/wiki/Canonicalization, Wikipedia, Accessed Jan. 30, 2017, 3 pages.

Platform as a service, https://en.wikipedia.org/wiki/Platform_as_a_service, Wikipedia, Accessed Jan. 30, 2017, 5 pages.

* cited by examiner

US 10,394,538 B2

OPTIMIZING SERVICE DEPLOYMENT IN A DISTRIBUTED COMPUTING ENVIRONMENT

BACKGROUND

The present invention generally relates to optimizing service deployment in a distributed computing environment and, more particularly, to optimizing service deployment in a distributed computing environment by reducing internal application programming interface (API) calls by individual application instances.

A distributed computing-based application (e.g., a cloud-based application) may interact with other micro-services and persistence storage devices to construct its in-memory state. Such interaction may include conducting multiple API calls on external service provider servers to obtain data which is then used to make internal API calls to construct the in-memory state of the cloud application.

As an illustrative example, suppose a cloud application receives a request to deploy a new artifact (e.g., a connector artifact) in connection with implementing a service (e.g., a connector service). As part of processing and executing the deployment, the cloud application may need to make a series of API calls on different external service provider and storages devices to obtain data regarding the configuration for the new connector artifact. Subsequently, the cloud application may need to make additional API calls on an external application server running a Software as a Service (SaaS) application corresponding to the connector type to obtain additional metadata about the connector to be created. The cloud application may then use all the data collected from the various sources to make internal API calls to create the connector in-memory. At this point, consumers of the connector service may utilize the newly deployed connector.

The above process may need to be repeated for each instance of the application cluster so that connector service requests can be load-balanced to a number of identical instances. For every connector artifact deployed, the external API calls are made by each instance. Also, in a case when an application cluster crashes, the above process must be re-executed in order for each instance to recreate its in-memory state prior to the crash and all the API calls would again need to be conducted as described above.

SUMMARY

In an aspect of the invention, a computer-implemented method includes receiving, by a computing device, a trigger indication to deploy a new artifact into an application cluster; obtaining, by the computing device, deployment data for the new artifact from one or more service entities via external application programming interface (API) calls; storing, by the computing device, the deployment data as a deployment data object; and providing, by the computing device, the deployment data object to a plurality of instances of the application cluster via internal API calls without the need for the plurality of instances to conduct external API calls to the one or more service entities.

In an aspect of the invention, there is a computer program product for reducing external application programming interface (API) calls in an application cluster the computer program product comprising a computer readable storage medium having program instructions embodied therewith. The program instructions are executable by a computing device to cause the computing device to: store consolidated deployment data for all artifacts deployed to the application cluster; provide the consolidated deployment data to a plurality of instances of the application cluster via internal API calls without the need for the plurality of instances to conduct external API calls to one or more service entities.

In an aspect of the invention, a system includes: a CPU, a computer readable memory and a computer readable storage medium associated with a computing device; program instructions to detect a deployment event; program instructions to obtain, by each instance, of a plurality of instances, consolidated deployment data from a centralized repository via internal application programming interface (API) calls based on detecting the deployment event; and program instructions to deploy artifacts in accordance with the consolidated deployment data obtained from the centralized repository via the internal API calls without conducting external API calls. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
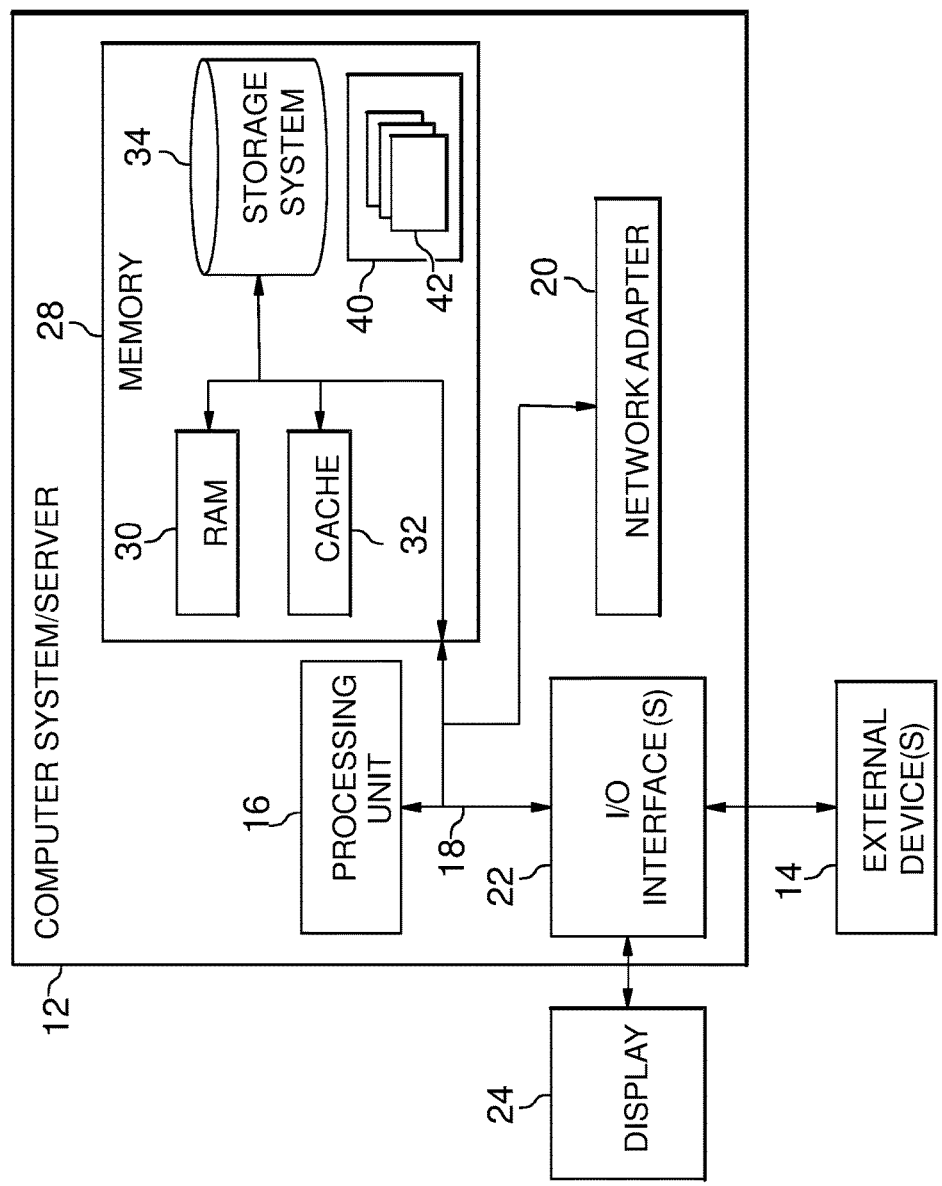
FIG. 1 depicts a cloud computing node according to an embodiment of the present invention.

The present invention generally relates to optimizing service deployment in a distributed computing environment and, more particularly, to optimizing service deployment in a distributed computing environment by reducing external application programming interface (API) calls by individual application instances. Aspects of the present invention may consolidate the location and time where a trigger for deployment of services and/or artifacts is handled in a distributed computing environment (also referred herein as a "cloud" or "cloud environment"). In this way, the number of external API calls may be reduced during a deployment, as each instance within an application cluster may not need to conduct external API calls to obtain data for creating in-memory states. Instead, only internal API calls are needed to obtain data for creating in-memory states, thereby reducing network resource usage and saving costs in a situation in which service providers charge per external API call.

As described herein, a compute function (e.g., a deployment management component) of an application cluster may consolidate the location and time where a trigger for deployment of services and/or artifacts is handled in a cloud environment. More specifically, the deployment management component may conduct external API calls to obtain data/configuration information from service provider servers in connection with the deployment of a new artifact, service, or the like. The deployment management component may store data relating to the new deployment in a normalized data structure (e.g., in the form of a JSON object or the like). Further, the deployment management component may store deployment data for all artifacts in a compressed archive. Accordingly, when a new deployment is triggered, each application instance in an application cluster may access deployment and configuration data from the compressed archive via internal API calls. In this way, conducting of external API calls are not need for each application instance to obtain the configuration information and/or other data required for building in-memory states. Further, conducting of external API calls are not need for each application instance to rebuild in-memory states after the occurrence of a crash or disruption of the application cluster. Instead, deployment information may be centralized internally within a network such that each application instance does not need to conduct external API calls to obtain the deployment information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
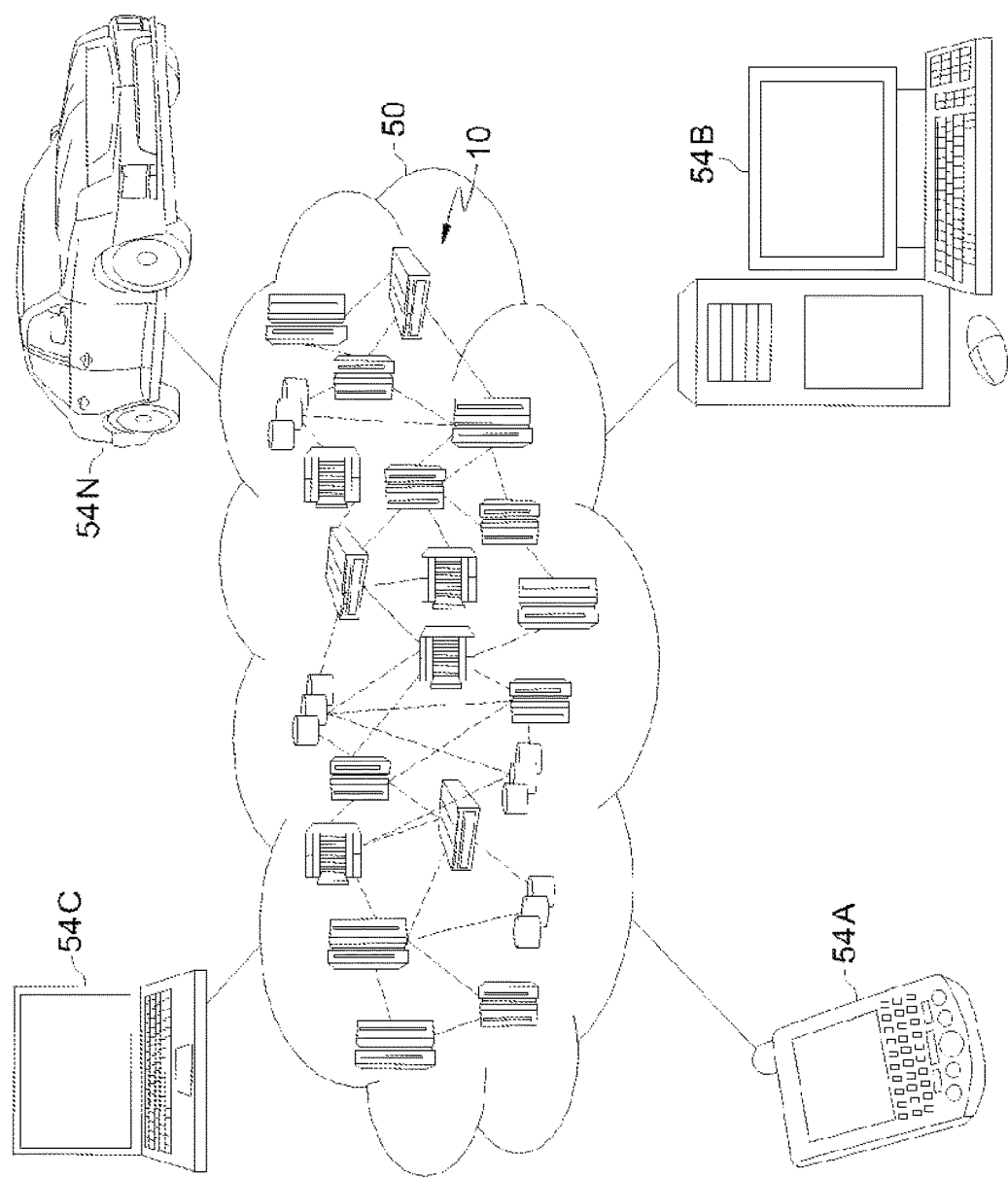
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
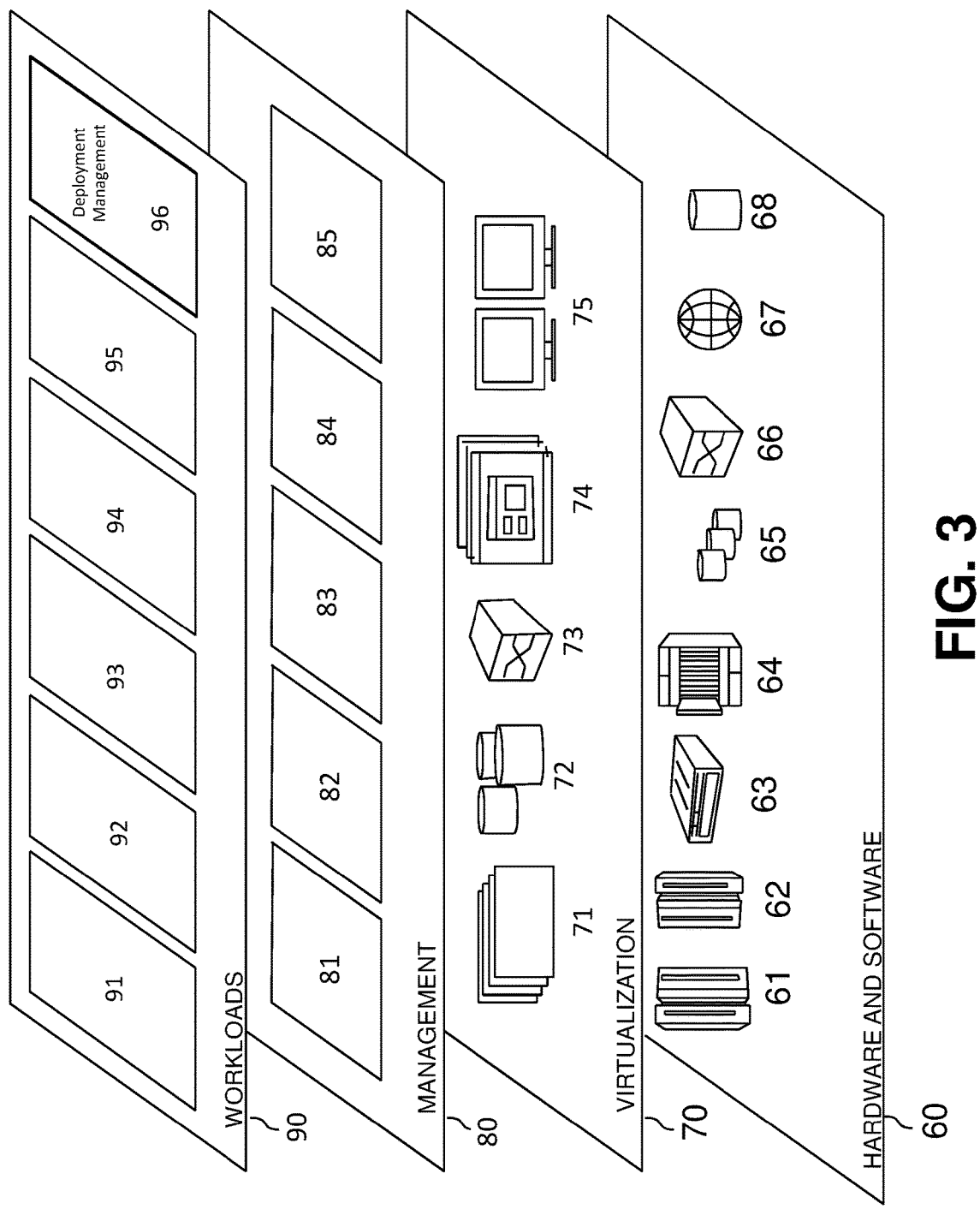
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94;

transaction processing 95; and deployment management 96.

Referring back to FIG. 1, the program/utility 40 may include one or more program modules 42 that generally carry out the functions and/or methodologies of embodiments of the invention as described herein (e.g., such as the functionality provided by deployment management 96). Specifically, the program modules 42 may receive a deployment trigger indication, obtain data in connection with deployment of new artifacts associated with deployment trigger, create a normalized deployment data for the artifact, and update a storage device with updated deployment data in the form of a compressed archive. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a deployment management component 210 as shown in FIG. 4.

Figure 4:
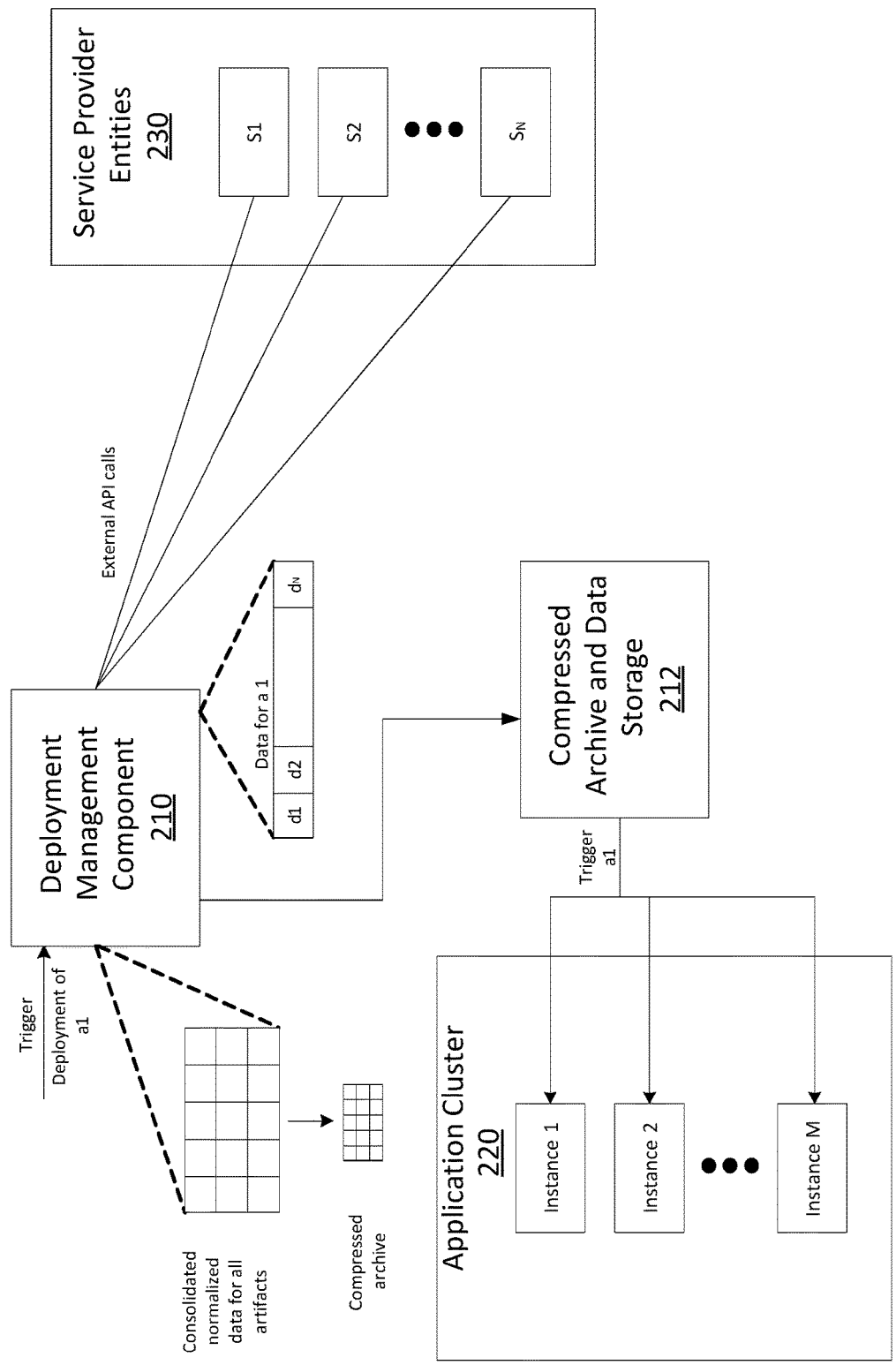
FIG. 4 shows an overview of an example implementation in accordance with aspects of the present invention

FIG. 4 shows an overview of an example implementation in accordance with aspects of the present invention. As shown in FIG. 4, a deployment management component 210 may receive a trigger or an instruction to deploy an artifact (e.g., artifact "a1") in an application cluster 220 having one or more instances (e.g., instance 1 through instance M). The deployment management component 210 may conduct external API calls with one or more service provider entities 230 (e.g., entities S1 through $S_N$) in order to obtain data associated with artifact a1 (e.g., configuration data and/or other related deployment data needed to deploy a1 in the application cluster 220). As further shown in FIG. 4, the deployment management component 210 may store the data for a1 in a data structure (e.g. data d1 through $d_N$). The data for a1 may be stored in a normalized format, such as a JSON object or other type of data object.

Based on storing the data for a1 in a data object, the deployment management component 210 may compute or determine consolidated deployment data for all artifacts (e.g., previously deployed artifacts in addition to the newly deployed a1 artifact). The consolidated data may be centrally stored as a compressed archive in a compressed archive and data storage 212 associated with the deployment management component 210. In this way, the compressed archive is updated with the deployment data for the newly deployed artifact a1. When the update to the compressed archive occurs, the compressed archive and data storage 212 may output a trigger message to each instance in the application cluster 220. Based on receiving the trigger, each instance in the application cluster 220 may conduct internal API calls with the compressed archive and data storage 212 to pull data from the consolidated/centralized compressed archive in order to deploy artifact a1 based on the deployment data within the compressed archive. In this way, each instance in the application cluster 220 need not conduct external API calls to obtain the deployment data. Further, in a situation in which a restart of the application cluster 220 is required, each instance in the application cluster 220 may conduct internal API calls to obtain the deployment data for all artifacts and restore the configuration for all artifacts without the need for each instance to conduct external API calls for each artifact.

Figure 5:
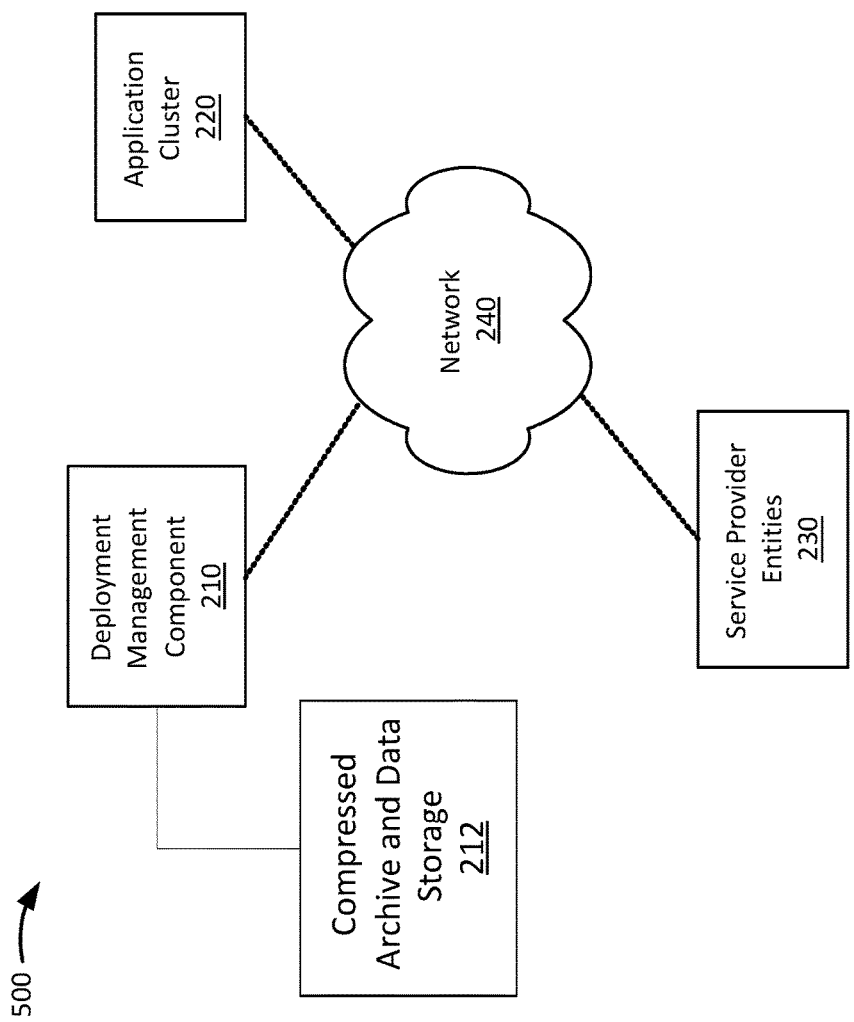
FIG. 5 shows an example environment in accordance with aspects of the present invention.

FIG. 5 shows an example environment in accordance with aspects of the present invention. As shown in FIG. 5, environment 500 may include a deployment management component 210, a compressed archive and data storage 212, an application cluster 220, service provider entities 230, and network 240. In embodiments, one or more components in environment 500 may correspond to one or more components in the cloud computing environment of FIG. 2. In embodiments, one or more components in environment 500 may include the components of computer system/server 12 of FIG. 1.

The deployment management component 210 may include one or more computing devices (e.g., such as computer system/server 12 of FIG. 1) that manages the deployment of artifacts to application cluster 220. As described herein the deployment management component 210 may conduct external API calls with one or more service provider entities 230 to obtain deployment data for the deployment of the artifacts. The deployment management component 210 may also maintain and manage a consolidated set of deployment data for artifacts deployed to the application cluster 220. The deployment management component 210 may store the consolidated set of deployment data as a compressed archive in the compressed archive and data storage 212 (e.g., a centralized repository). In embodiments, the deployment management component 210 may be implemented as a server-less function or may be implemented by a server device.

The application cluster 220 may include one or more computing devices (e.g., such as computer system/server 12 of FIG. 1) that implements applications and/or multiple instances of applications. As described herein, each instance within the application cluster 220 may conduct internal API calls with the compressed archive and data storage 212 to obtain deployment data for artifacts without the need to conduct external API calls with the service provider entities 230.

The service provider entities 230 may include one or more computing devices (e.g., such as computer system/server 12 of FIG. 1) that provide services for use in the application cluster 220. The services provided by the service provider entities 230 may be provided via one or more servers or via a virtualized environment (e.g., different entities may be implemented as virtual images or virtual machines). As described herein, the deployment management component 210, the compressed archive and data storage 212, and application cluster 220 may be part of the same network or internal computing environment, whereas the service provider entities 230 may be in a network external to the deployment management component 210, compressed archive and data storage 212, and application cluster 220.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
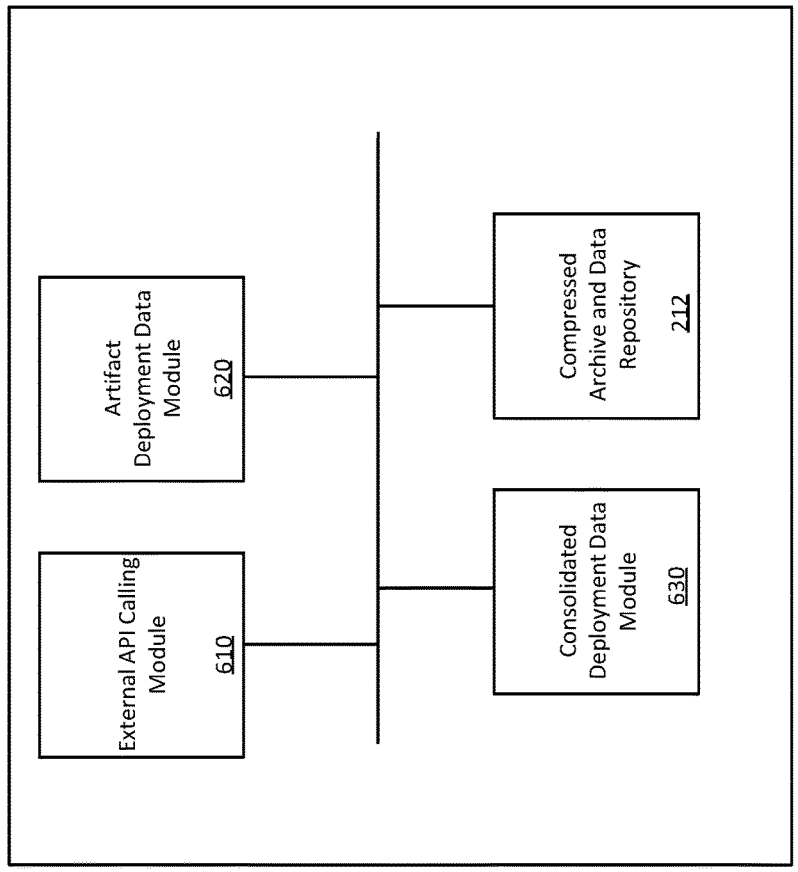
FIG. 6 shows a block diagram of example components of a deployment management component in accordance with aspects of the present invention.

FIG. 6 shows a block diagram of example components of a deployment management component in accordance with aspects of the present invention. As shown in FIG. 6, the deployment management component 210 may include an external API calling module 610, an artifact deployment data module 620, a consolidated deployment data module 630, and a compressed archive and data storage 212. In embodiments, the deployment management component 210 may include additional or fewer components than those shown in FIG. 6. In embodiments, separate components may be integrated into a single computing component or module. Additionally, or alternatively, a single component may be implemented as multiple computing components or modules.

The external API calling module 610 may include a program module (e.g., program module 42 of FIG. 1) that conducts external API calls to one or more service provider entities 230. For example, the external API calling module 610 may conduct the external API calls based on receiving a trigger or instruction to deploy an artifact to an application cluster 220. In embodiments, the external API calls may be made to request deployment data required to deploy the artifact.

The artifact deployment data module 620 may include a program module (e.g., program module 42 of FIG. 1) that stores deployment data for an artifact received from the one or more service provider entities 230. In embodiments, the artifact deployment data module 620 may store the deployment data as a data object in a normalize format, such as a JSON object and/or other type of object.

The consolidated deployment data module 630 may include a program module (e.g., program module 42 of FIG. 1) that consolidates deployment data for all artifacts deployed to the application cluster 220. For example, the consolidated deployment data module 630 may add data objects for newly deployed artifacts and generate a compressed archive including the consolidated deployment data for all the artifacts. In this way the compressed archive includes up-to-date deployment data for newly deployed artifacts.

The compressed archive and data storage 212 may include a data storage device (e.g., storage system 34 of FIG. 1) that stores the consolidated deployment data compressed archive. The compressed archive and data storage 212 may also store an individual data object for a newly deployed artifacts. The compressed archive and data storage 212 may be a centralized repository that stores the data objects for individual artifacts and a compressed archive with consolidated deployment data for all artifacts deployed in the application cluster 220. In embodiments, when a change to the compressed archive and data repository 212 is made (e.g., when the consolidated deployment data module 630 updates the compressed archive to include a deployment data object for a newly deployed artifact and/or when a new data object for a new artifact is created), the compressed archive and data storage 212 may provide a trigger or message to instances in the application cluster 220 regarding the newly deployed artifact. In turn, each instance in the application cluster 220 may access the data object for the newly deployed artifact and obtain the deployment data for the new artifact by conducting internal API calls with the compressed archive and data storage 212 without conducting external API calls to the service provider entities 230.

Figure 7:
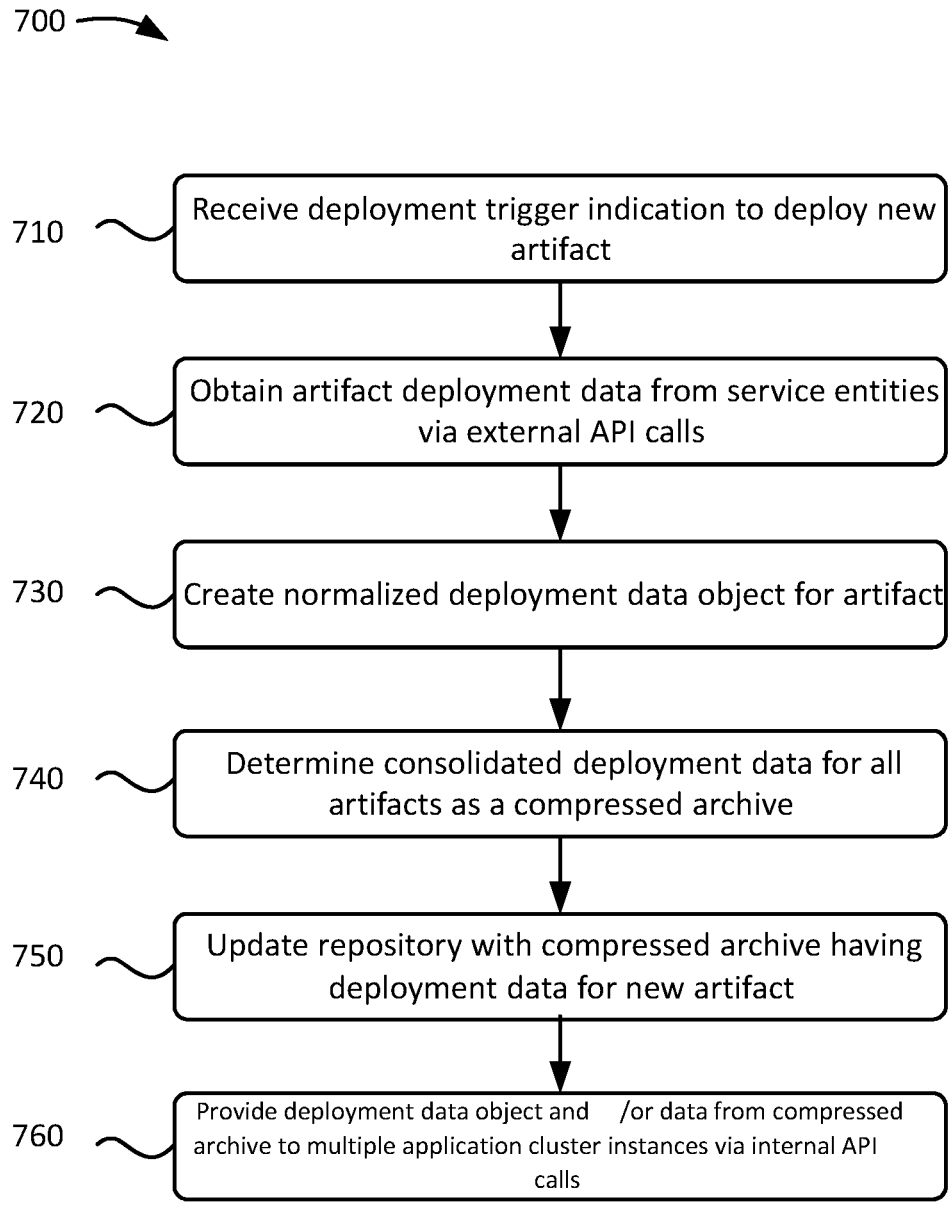
FIG. 7 shows an example flowchart of a process for maintaining and updating a consolidated compressed archive with deployment data for a newly deployed artifact in accordance with aspects of the present invention.

FIG. 7 shows an example flowchart of a process for maintaining and updating a consolidated compressed archive with deployment data for a newly deployed artifact. The steps of FIG. 7 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 7, process 700 may include receiving a deployment trigger indication to deploy a new artifact (step 710). For example, as described above with respect to the external API calling module 610, the deployment management component 210 may receive a deployment trigger indication (e.g., an instruction to deploy a new artifact to the application cluster 220) from a user, administrator, and/or automated process in connection with adding services to the application cluster 220. The trigger indication may identify the artifact (e.g., name, type, service entities associated with the artifact, etc.).

Process 700 may further include obtaining artifact deployment data from one or more service entities via external API calls (step 720). For example, as described above with respect to the external API calling module 610, the deployment management component 210 may conduct external API calls to one or more service provider entities 230 based on receiving a trigger or instruction to deploy an artifact to an application cluster 220. In embodiments, the external API calls may be made to request deployment data required to deploy the artifact.

Process 700 may also include creating normalized deployment data for the artifact (step 730). For example, as described above with respect to the artifact deployment data module 620, the deployment management component 210 may normalize the deployment data for an artifact received from the one or more service provider entities 230. In embodiments, the deployment management component 210 may normalize the deployment data by organizing the data in a particular format that can be interpreted by each instance of the application cluster 220 for deploying the artifact, as will be described in greater detail below.

Process 700 may further include determining consolidated deployment data for all artifacts as a compressed archive (step 740). For example, as described above with respect to the consolidated deployment data module 630, the deployment management component 210 may consolidate deployment data for all artifacts deployed to the application cluster 220. For example, the deployment management component 210 may add data objects for newly the deployed artifact and generate a compressed archive including the consolidated deployment data for all the artifacts. In embodiments, the deployment management component 210 may access an existing compressed archive that is currently stored in the compressed archive and data storage 212, and append the data object for the newly deployed artifact to the existing compressed archive to form an updated compressed archive.

Process 700 may also include updating a repository with the compressed archive having deployment data for the new artifact (step 750). For example, as described above with respect to the consolidated deployment data module 630 and the compressed archive and data storage 212, the deployment management component 210 may update a repository (e.g., the compressed archive and data storage 212) with the updated compressed archive. In embodiments, the deployment management component 210 may overwrite a prior version of the compressed archive with the updated compressed archive having the consolidated deployment data for all artifacts in the application cluster 220 including the newly deployed artifact. Additionally, or alternatively, the deployment management component 210 may append the data object for the newly deployed object to an existing compressed archive stored by the compressed archive and data storage 212. In this way the compressed archive includes up-to-date deployment data for newly deployed artifacts. In embodiments, when a change to the compressed archive is made (e.g., when the consolidated deployment data module 630 updates the compressed archive to include a deployment data object for a newly deployed artifact), the compressed archive and data storage 212 may provide a trigger or message to instances in the application cluster 220 regarding the newly deployed artifact.

Process 700 may further include providing the deployment data object and/or data from the compressed archive to multiple application cluster instances via internal API calls (step 760). For example, the deployment management component 210 may provide the deployment data object for the newly deployed artifact to each instance of the application cluster 220 (e.g., when the instances request the objects via internal API calls after receiving triggers notifying the instances that a new artifact has been deployed). As described herein, each instance of the application cluster 220 may use the data from the data object to deploy the new artifact without the need for each of the instances to conduct external API calls with the service provider entities 230. Additionally, or alternatively, the deployment management component 210 may provide data from the compressed archive to each instance in the application cluster 220 so that each instance can rebuild/restore pre-crash configurations without the need for each instance to conduct external API calls with the service provider entities 230.

As described herein, the each instance of the application cluster 220 may access the compressed archive via internal API calls with the deployment management component 210 to obtain deployment data for deploying the newly deployed archive. Additionally, or alternatively, each instance of the application cluster 220 may access the compressed archive via internal API calls to obtain deployment data for restoring the configuration of the application cluster 220 with all artifacts (e.g., in a situation in which the application cluster 220 needs to be restarted, such as after a crash of the application cluster 220 or other situation requiring a restart of the application cluster 220). Further, the application cluster 220 may access the compressed archive via internal API calls to obtain deployment data for creating a new instance within the application cluster 220 with all deployed artifacts. As such, each instance of the application cluster 220 need not conduct external API calls with the service provider entities 230, thereby reducing restoration/deployment time and network resource consumption.

Figure 8:
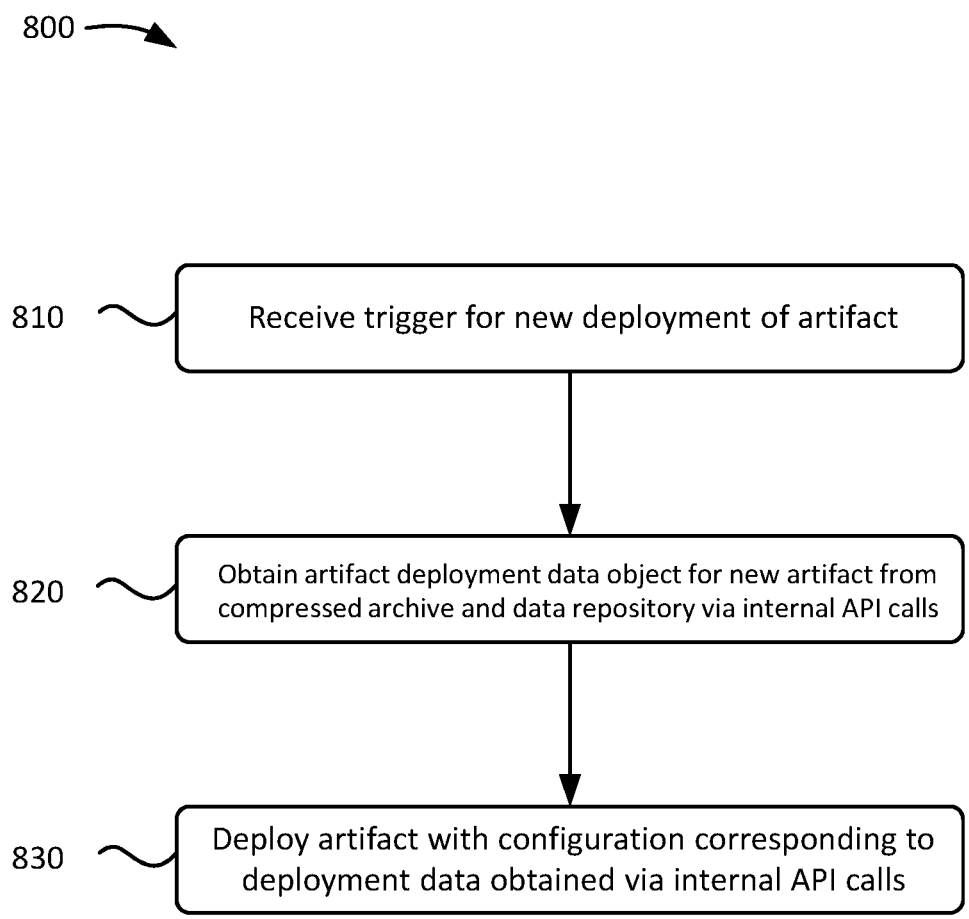
FIG. 8 shows an example flowchart of a process for deploying a new artifact in an application cluster without requiring each instance in the application cluster to conduct external API calls in accordance with aspects of the present invention.

FIG. 8 shows an example flowchart of a process for deploying a new artifact in an application cluster without requiring each instance in the application cluster to conduct external API calls. The steps of FIG. 8 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 8, process 800 may include receiving a trigger for a new deployment of an artifact (step 810). For example, each instance of the application cluster 220 may receive a trigger for the new deployment of an artifact from the deployment management component 210 (e.g., when the deployment management component 210 updates the compressed archive and data storage 212 that stores consolidated deployment data).

Process 800 may further include obtaining an artifact deployment data object for the new artifact from the compressed archive and data repository via internal API calls (step 820). For example, each instance of the application cluster 220 may obtain an artifact deployment data object for the new artifact from the compressed archive and data repository 212 via internal API calls. Since the deployment data is stored in a normalized format, each instance may interpret the data based on a formatting scheme for deploying the artifact.

Process 800 may also include deploying the artifact with a configuration corresponding to the deployment data obtained via the internal API calls (step 830). For example, each instance of the application cluster 220 may deploy the artifact having a configuration that corresponds to the deployment data obtained via the internal API calls. In this way, the artifact may be deployed in the application cluster 220 without the need for each instance of the application cluster 220 to conduct external API calls with the service provider entities 230.

Figure 9:
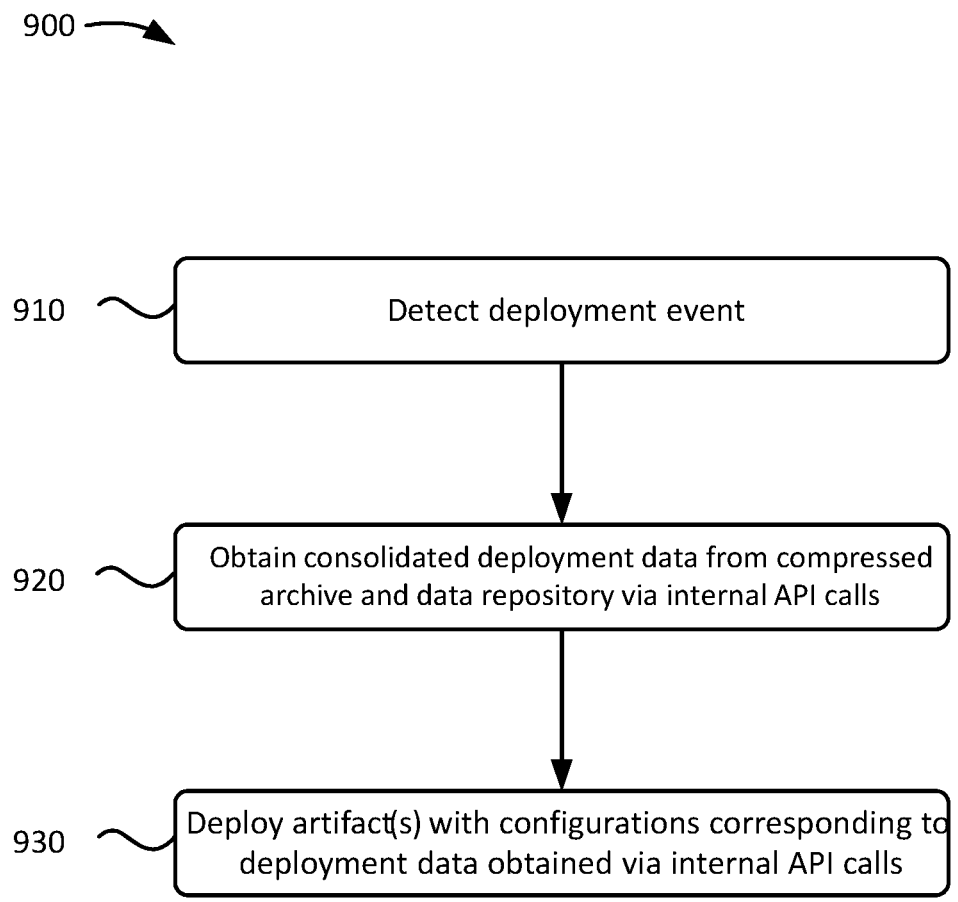
FIG. 9 shows an example flowchart of a process for regenerating an application cluster instance without requiring the instance to conduct external API calls in accordance with aspects of the present invention.

FIG. 9 shows an example flowchart of a process for regenerating an application cluster instance without requiring the instance to conduct external API calls. The steps of FIG. 9 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 9, process 900 may include detecting a deployment event (step 910). For example, the application cluster 220 may detect a deployment event, such as the occurrence of a restart of the application cluster 220. Additionally, or alternatively, the deployment event may include the receipt of an instruction or trigger to deploy a new instance within the application cluster 220.

Process 900 may also include obtaining deployment data from the compressed archive and data repository via internal API calls (step 920). For example, each instance of the application cluster 220 (e.g., each instance to be regenerated or each new instance to be deployed) may obtain the consolidated deployment data from the compressed archive and data storage 212 via internal API calls without the need to conduct external API calls.

Process 900 may further include deploying all artifacts with configurations corresponding to the deployment data obtained via the internal API calls (step 930). For example, each instance of the application cluster 220 (e.g., each instance to be regenerated or each new instance to be deployed) may deploy all artifacts with configurations corresponding to the deployment data obtained data obtained via the internal API calls and without the need to conduct external API calls. As a result, the instances may be generated to a pre-crash state and new instances may be deployed with the proper configuration of artifacts without the need to conduct external API calls, thereby reducing deployment/restoration time and reducing network resource consumption.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, a trigger indication to deploy a new artifact into an application cluster;
obtaining, by the computing device, deployment data for the new artifact from one or more service entities via external application programming interface (API) calls;
storing, by the computing device, the deployment data as a deployment data object in a centralized repository that is accessible to a plurality of instances of the application cluster via internal API calls;
providing, by the computing device, the deployment data object to a plurality of instances of the application cluster via internal API calls to the centralized repository without the need for the plurality of instances to conduct external API calls to the one or more service entities,
consolidating the deployment data for the new artifact with deployment data for existing artifacts in the application cluster;
storing the consolidated deployment data in the centralized repository; and
providing the consolidated deployment data to the plurality of instances of the application cluster via internal API calls to the centralized repository after a restart of the application cluster to restore each of the plurality of instances to a configuration prior to the restart of the application cluster without the need for the plurality of instances to conduct external API calls to the one or more service entities after the restart.

2. The method of claim 1, further comprising organizing the deployment data after obtaining the deployment data and prior to storing the deployment data as the deployment data object.

3. The method of claim 2, wherein the deployment data is organized as in a JavaScript Object Notation (JSON) format.

4. The method of claim 1 further comprising storing the consolidated deployment data as a compressed archive.

5. The method of claim 1, further comprising: providing a trigger notification to each of the plurality of instances of the application cluster based on storing the deployment data object.

6. The method of claim 1, wherein a service provider at least one of creates, maintains, deploys and supports the computing device.

7. The method of claim 1, wherein the receiving the trigger indication, the obtaining the deployment data, the storing the deployment data object, and the providing the deployment data object are provided by a service provider on a subscription, advertising, and/or fee basis.

8. The method of claim 1, wherein the computing device includes software provided as a service in a cloud environment.

9. The method of claim 1, further comprising deploying a system for reducing external API calls when deploying an artifact, comprising providing a computer infrastructure operable to perform the receiving the trigger indication, the obtaining the deployment data, the storing the deployment data object, and the providing the deployment data object.

10. The method of claim 1, further comprising:
storing the consolidated deployment data as a compressed archive; and
providing a trigger notification to each of the plurality of instances of the application cluster based on storing the deployment data object.

11. A computer program product for reducing external application programming interface (API) calls in an application cluster the computer program product comprising a computer readable storage medium having program instructions embodied therewith, the program instructions executable by a computing device to cause the computing device to:
store consolidated deployment data for all artifacts deployed to the application cluster in a centralized repository that is accessible to a plurality of instances of the application cluster via internal API calls; and
provide the consolidated deployment data to a plurality of instances of the application cluster via internal API calls to the centralized repository without the need for the plurality of instances to conduct external API calls to one or more service entities,
wherein the program instructions further cause the computing device to:
receive a trigger indication to deploy a new artifact into an application cluster;
obtain deployment data for the new artifact from the one or more service entities via external application programming interface calls;
update the consolidated deployment data in the centralized repository with the deployment data for the new artifact; and
provide the consolidated deployment data to the plurality of instances of the application cluster via internal API calls to the centralized repository after a restart of the application cluster to restore each of the plurality of instances to a configuration prior to the restart of the application cluster without the need for the plurality of instances to conduct external API calls to the one or more service entities after the restart.

12. The computer program product of claim 11, wherein the storing the consolidated deployment data includes storing the consolidated deployment data as a compressed archive.

13. The computer program product of claim 11, wherein the program instructions further cause the computing device to:
store the deployment data for the new artifact as a deployment data object;
provide the deployment data object to a plurality of instances of the application cluster via internal API calls to cause the plurality of instances of the application cluster to deploy the new artifact without the need for the plurality of instances to conduct external API calls to the one or more service entities.

14. A system comprising:
a CPU, a computer readable memory and a computer readable storage medium associated with a computing device;
program instructions to receive a trigger indication to deploy a new artifact into an application cluster;
program instructions to obtain deployment data for the new artifact from one or more service entities via external application programming interface (API) calls;
program instructions to store the deployment data as a deployment data object in a centralized repository that is accessible to a plurality of instances of the application cluster via internal API calls;
program instructions to consolidate the deployment data for the new artifact with deployment data for existing artifacts in the application cluster;
program instructions to store the consolidated deployment data in the centralized repository;
program instructions to deploy artifacts in accordance with the consolidated deployment data obtained via the internal API calls to the centralized repository without conducting external API calls; and
program instructions to provide the consolidated deployment data to the plurality of instances of the application cluster via internal API calls to the centralized repository after a restart of the application cluster to restore each of the plurality of instances to a configuration prior to the restart of the application cluster without the need for the plurality of instances to conduct external API calls to the one or more service entities after the restart,
wherein the program instructions are stored on the computer readable storage medium for execution by the CPU via the computer readable memory.

15. The system of claim 14, further comprising program instructions to deploy a new instance into the application cluster.

* * * * *